United States Patent [19]
Boitnott

[11] 3,990,679
[45] Nov. 9, 1976

[54] STEM SEALING FOR HIGH PRESSURE VALVE OR THE LIKE

[75] Inventor: Boyd D. Boitnott, Houston, Tex.

[73] Assignee: Gray Tool Company, Houston, Tex.

[22] Filed: Mar. 20, 1975

[21] Appl. No.: 560,237

[52] U.S. Cl. .............................. 251/214; 277/72 FM
[51] Int. Cl.² ......................................... F16K 31/44
[58] Field of Search ............ 251/214, 326, 327, 330; 277/21, 68, 72 R, 72 FM, 73

[56] References Cited
UNITED STATES PATENTS

| | | | |
|---|---|---|---|
| 3,049,082 | 8/1962 | Barry | 277/68 |
| 3,135,285 | 6/1964 | Volpin | 251/327 |
| 3,288,473 | 11/1966 | Hinds | 277/72 FM |
| 3,307,826 | 3/1967 | Lowrey | 251/327 |
| 3,325,173 | 6/1967 | Alt | 277/68 |
| 3,544,064 | 12/1970 | Carlin | 251/214 |
| 3,599,991 | 8/1971 | Combes et al. | 251/214 |
| 3,883,112 | 5/1975 | Milleville et al. | 251/214 |

Primary Examiner—Martin P. Schwadron
Assistant Examiner—G. L. Walton
Attorney, Agent, or Firm—Cushman, Darby & Cushman

[57] ABSTRACT

Apparatus and method for sealing a shaft extending between a high-pressure region and a low-pressure region so that the seal life is long, and so that stem torque as a result of the sealing is kept to a minimum. A plurality of sealing elements are provided and arranged so that the differential pressure across any one sealing element is only a fraction of the pressure differential between the high-pressure and the low-pressure regions. Flowable plastic or the like under selected pressures is injected and maintained between adjacent sealing elements.

21 Claims, 3 Drawing Figures

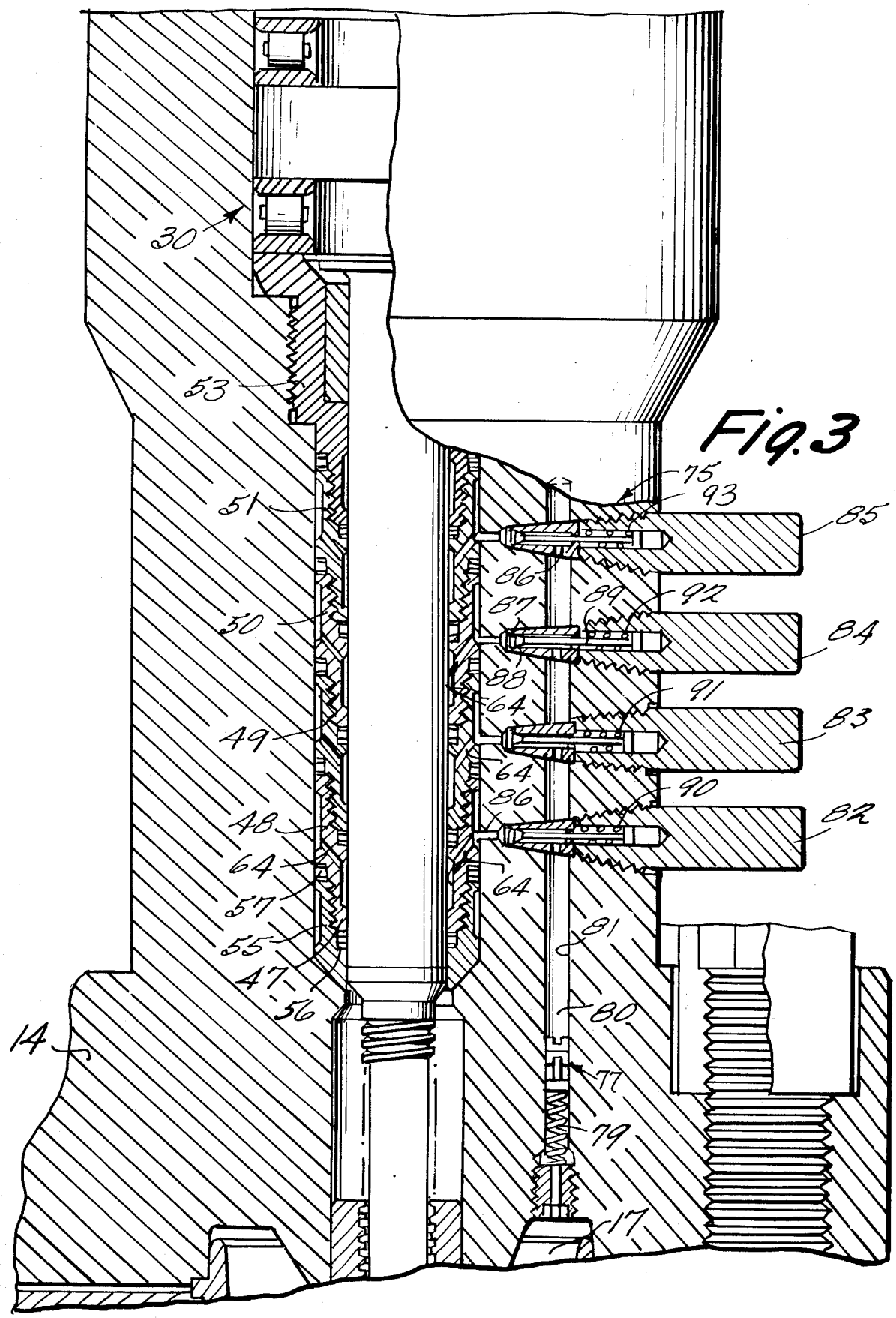

STEM SEALING FOR HIGH PRESSURE VALVE OR THE LIKE

BACKGROUND AND SUMMARY OF THE INVENTION

In providing valves and related elements for high-pressure environments the problems of rapid seal deterioration and high stem torque as a result of the high pressures are always encountered. This is particularly so in the valving of fluids at 20,000 psi, as is necessary in many modern fluid systems. Past attempts to solve such problems have not been entirely successful, often just relying on the quality of sealing materials, which have finite limits. U.S. Pat. No. 3,288,473 attempts to solve the problem of short seal life by providing a plurality of sealant passageways, each to be filled with sealant as the previous seal fails. This merely provides a temporary remedy, however, rather than solving the problem.

According to the present invention a long-life, low stem torque, valve stem seal is provided by utilizing a series of pressure barriers, each barrier withstanding only a fraction of the total pressure differential between the fluid cavity to be sealed and the atmosphere. Plastic is injected between each of the fluid elements of the barriers at a pressure that decreases from the high-pressure cavity to the atmosphere. Various means may be utilized for maintaining the plastic under the proper pressure in each chamber between barriers, such as a one-way pressurized injection valve, an exterior high-pressure chamber, or a channel having plastic under high-pressure with a plurality of differential back-pressure valves therein.

It is the primary object of he present invention to provide an improved apparatus and method for providing long-life shaft seals and low stem torque in high-pressure environments. This and other objects of the invention will become clear from an inspection of the detailed description of the invention and from the appended claims.

BRIEF DESCRIPTION OF THE DRAWINGS

FIG. 3 is a detail cross-sectional view of another embodiment of pressure maintaining means according to the present invention.

DETAILED DESCRIPTION OF THE INVENTION

Figure 1:
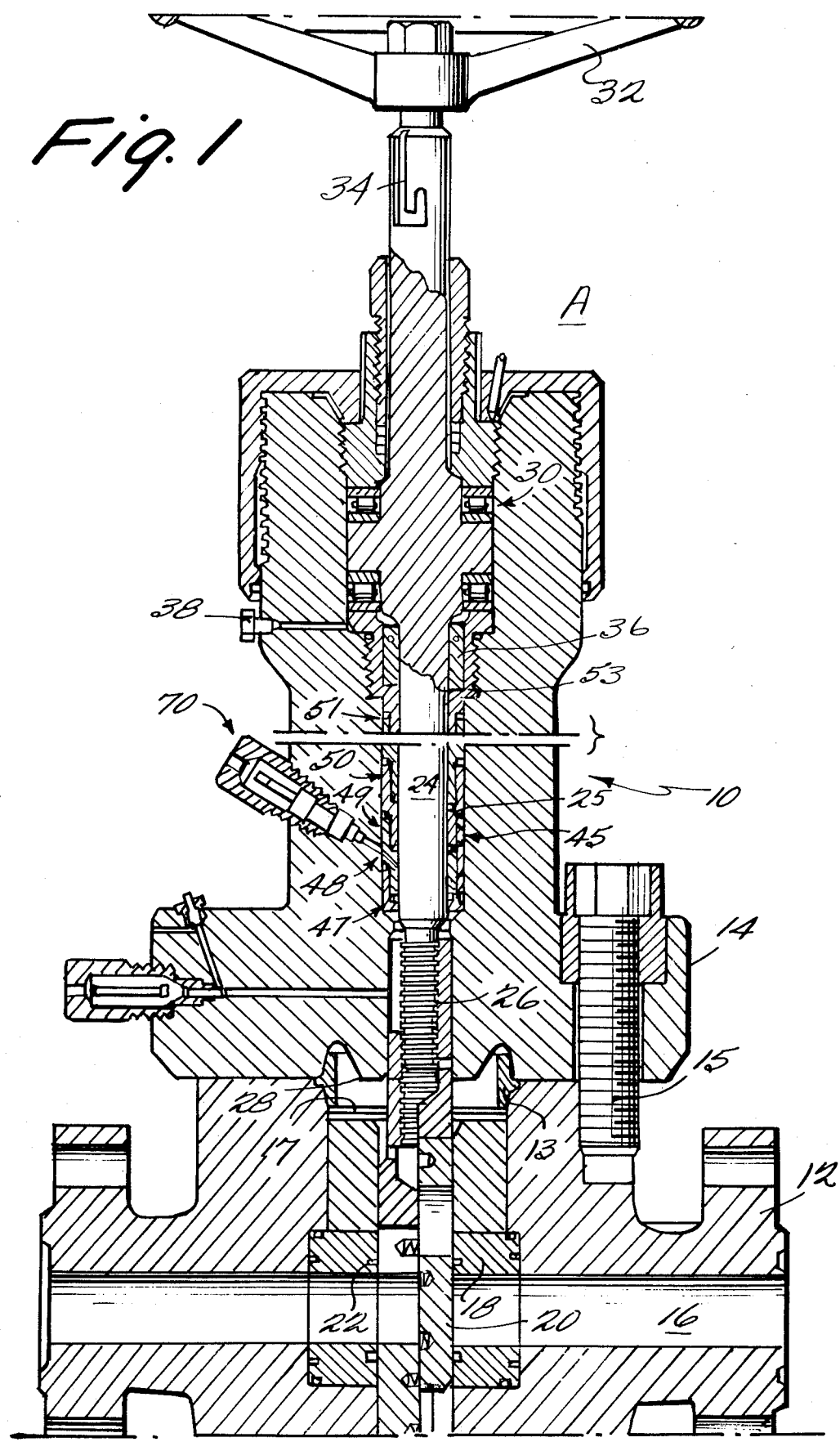
FIG. 1 is a side view of a gate valve, partly in cross-section and partly in elevation, according to the teachings of the present invention, shown in the closed and open positions thereof.

An exemplary gate valve assembly according to the teachings of the present invention is shown generally at 10 in FIG. 1. The assembly 10 preferably includes two main components, a body member 12, and a bonnet 14. A bonnet seal ring 13 seals the members 12 and 14 together, and bonnet studs 15 prevent separation of members 12 and 14. A bore 16 adapted to carry fluids under high pressure extends through body member 12, and communicates with a valve cavity 17. The bore 16 may be a 2 inch bore, and is adapted to carry fluids at 20,000 psi.

Valving of the fluid carried through bore 16 may be accomplished by moving a valve member 20 relative to valve seat 18, which seat is connected to body member 12 and surrounds bore 16. Seals 22 or the like on the face of valve seat 18 cooperate with the face of valve member 20 to seal off the bore 16 in one position of valve member 20. The valve member 20 is movable from a position wherein it completely blocks the flow of fluid through the bore 16 (right-hand section of FIG. 1), to a position wherein it allows free, unrestricted flow of fluid through bore 16 (left-hand section of FIG. 1).

Movement of valve member 20 from the blocking to the fluid-flow allowing positions thereof is preferably accomplished by means that require a minimum amount of relative movement between the components of assembly 10 and the surrounding environment. This is most advantageously accomplished by providing a stem or shaft 24 rotatable in a bore 25 and having a screw-threaded extension 26 thereof, which extension cooperates with corresponding threads on an extension 28 of valve member 20. Shaft 24 is journalled in bearing 30, and rotation thereof may be effected by the rotation of hand wheel 32 attached to a portion of shaft 24 extending outwardly from the bonnet 14. It will be seen that rotation of shaft 24 — as by wheel 32 — results in translation of valve member 20 due to the threaded-engagement between portions 26 and 28 of shaft 24 and valve member 20 respectively. No translation of shaft 24 occurs.

If desired, shaft 24 may be provided in the portion thereof exterior of bonnet 14 with a "J slot" 34. J slot 34 allows a service tool to retrieve and/or replace insert 36 or the like, even under pressure.

Since the shaft 24 extends from the high-pressure (i.e., 20,000 psi) region 17 to the atmosphere or other relatively low-pressure region A, it is necessary to provide means for sealing the shaft 24. Sealing means according to the present invention having long life and exerting a minimum of torque on the shaft 24, are shown generally at 45 in the drawings [U.S. Pat. Nos. 3,307,826 and 3,544,064 show prior art sealing means for gate valves.] As shown most clearly in FIG. 2 such sealing means include a plurality of sealing elements—five sealing elements, 47, 48, 49, 50, and 51 being shown. The sealing element 47 is closest to the high-pressure region 17, and sealing element 51 is closest to the packing retainer gland assembly 53 and low-pressure region A.

The sealing element 47 closest the high-pressure region 17 may comprise a tubular body member 55 having an inner seal 56 for sealing engagement between 55 and shaft 24, and an outer seal 57 for sealing engagement between 55 and bore 25 for shaft 24. Interior threads 58 may be provided for engagement with exterior threads on adjacent sealing element 48. Each other sealing element besides element 47 may comprise a slightly differently shaped tubular body member 60 having an inner seal 61 thereof and an outer seal 62 thereof. Cooperating inner and outer threads may be formed on the various sealing elements to provide for close-fitting interengagement therebetween. Each seal may be of any suitable construction and may have anti-extrusion washers disposed on the top and bottom surfaces thereof.

The series 47–51 of sealing elements is so arranged that none of the sealing elements is subjected to more than a fraction of the total pressure differential between the high-pressure region 17 and the relatively low-pressure region A. This is accomplished by injecting plastic 80 or like semi-solid or viscous flowable material under a particular pressure into each of the chambers 64 formed within elements 48, 49, 50, and 51, each chamber 64 being between seals 56 and 61 and 57 and 62, or between two seals 61 and two seals 62. The plastic 80 under pressure exerts its pressure between two adjacent sealing elements so that the differential pressure thereacross is not as great as the differential between the high-pressure region 17 and the relatively low-pressure region A.

Means for ensuring that the differential pressure on each of said sealing elements is not greater than a predetermined amount and that no sealing element differential pressure is as large as the pessure differential between the cavity and the low-pressure region includes means 70 for injecting plastic material 80 into the areas between adjacent sealing elements.

An example of how the sealing means 45 might function to insure that the differential pressure across any one sealing element 47–51 was not greater than what that sealing element could reasonably bear under extended operation thereof is as follows Plastic 80 under a pressure of 16,000 psi is injected into chamber 64 in sealing element 48. This means that if the line pressure (pressure in cavity 17) is 20,000 psi, the differential pressure across sealing element 47 is 20,000 − 16,000 = 4,000 psi. Plastic under a pressure of 12,000 psi is injected into chamber 64 in sealing element 49. This means that the differential pressure across element 48 is 16,000 − 12,000 = 4,000 psi. Plastic under a pressure of 8,000 psi is injected into chamber 64 of sealing element 50, thus the differential pressure across element 49 is 12,000 − 8,000 = 4,000 psi. Plastic under a pressure of 4,000 psi is injected into chamber 64 in sealing element 51, thus the differential pressure across sealing element 50 is 8,000 − 4,000 = 4,000 psi. No plastic need be injected behind the element 51, the area therebehind being atmospheric pressure or another relatively low pressure A, therefore, the pressure differential across element 51 = 4,000 − atmoshperic pressure. Thus it will be seen that no one sealing element need have a pressure differential thereacross of more than 4,000 psi. Sealing elements obviously have a much longer life when the pressure differential thereacross is 4,000 psi rather than 20,000 psi, and relatively less expensive materials can be used. Also, the torque exerted by the sealing elements on the shaft 24 will be much less when there is a gradual step-down of pressures than if one seal bears a 20,000 psi differential, and thus it should be possible for one man to manually rotate the wheel 32 even when the pressure of the fluid in bore 16 is 20,000 psi.

Figure 2:
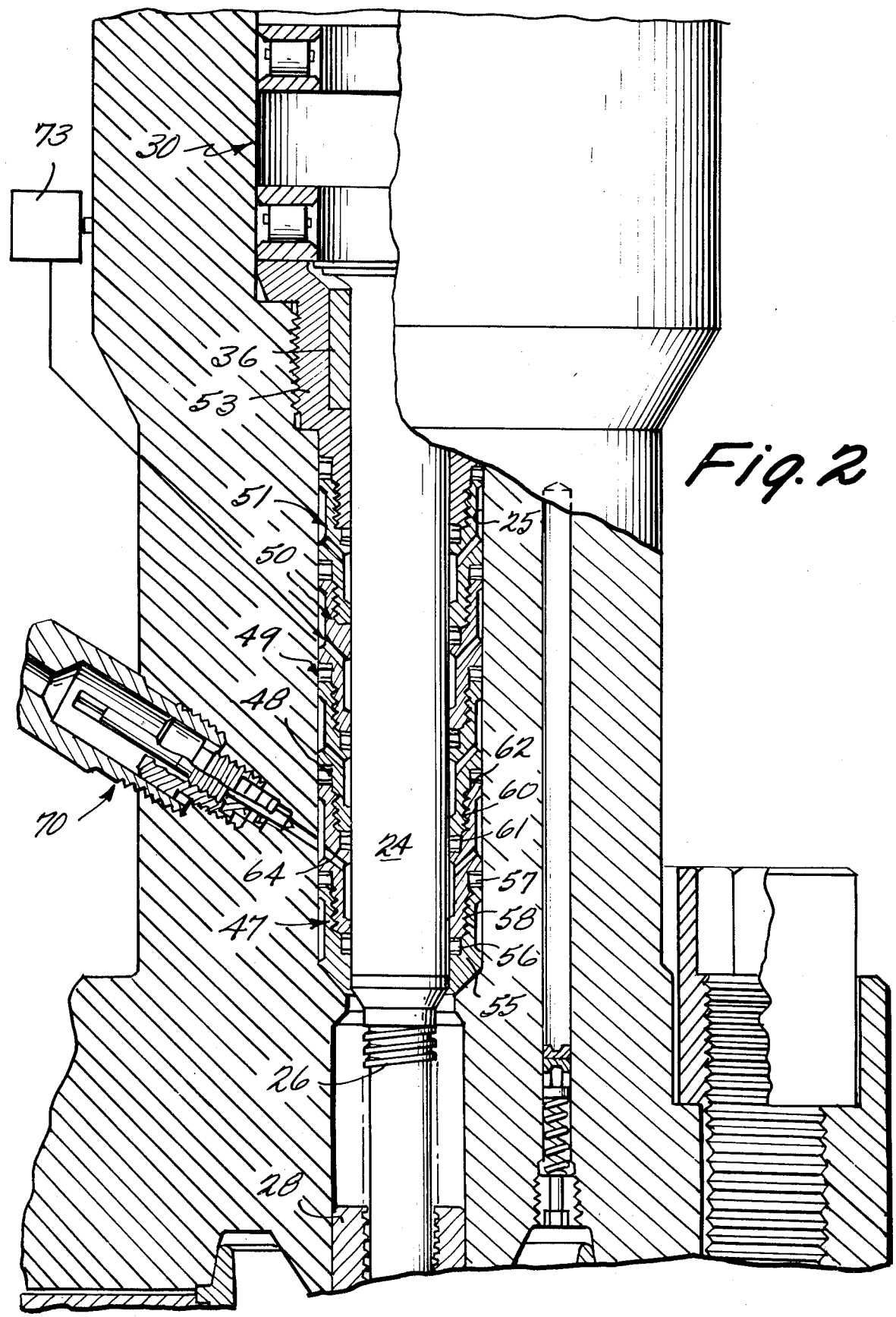
FIG. 2 is a detail cross-sectional view of exemplary sealing and pressure maintaining means according to the present invention.

Various means can be utilized for injecting the plastic 80 or like material and/or maintaining it under the proper pressure. For instance, as shown in FIGS. 1 and 2 a conventional needle valve 70 with a port 72 extending therefrom to a chamber 64 is utilized with each sealing element 48–51. Plastic injected through valve 70 under a specified pressure will be retained at that pressure by the valve 70.

Another means for maintaining the pressure within a chamber 64 at a specified value is shown diagrammatically in FIG. 2. This includes an exterior pressure source 73 in fluid communication with a port 64. By adjusting the pressure of the plastic or like material in source 73, the pressure in chamber 64 is determined.

Another pressure maintaining means that has the advantage of not applying higher pressure to the seals than line pressure demands is shown generally at 75 in FIG. 3. Means 75 includes a floating piston 77 disposed in a channel 81 and having one side thereof connected to the high-pressure cavity 17, with the other side thereof bearing against plastic 80 or like material under compression in channel 81. A spring 79 may be provided for normally acting in conjunction with the pressure in cavity 17 for maintaining the plastic 80 under pressure. Located in each passageway 86 between each chamber 64 and the channel 81 is a differential back pressure valve, 82, 83, 84, or 85, that restricts the seal element pressure to a given value below line 16 pressure. The valves 82–85 may be of any suitable construction but preferably each include a valve seat 87, a movable valve member 88, a stem 89 or the like connected to movable valve member 88, and a biasing means acting on steam 89 and valve member 88 for biasing the valve member 88 toward engagement with valve seat 87. The biasing means may take the form of a coil spring, such as a spring 90, 91, 92, or 93 respectively. The spring constant of each of the biasing means 90–93 is selected so that the valve member 88 associated therewith will only open a given pressure. For example, spring 90 is chosen so that valve 83 will only open when the pressure in channel 81 is greater than 4,000 psi. Thus, if the pressure in cavity 17 is 20,000 psi, the pressure of plastic in chamber 64 of sealing element 48 is 20,000 − 4,000 = 16,000 psi. Similarly, the spring 91 is chosen so that valve 83 opens only upon a pressure of 8,000 psi, spring 92 is chosen so that valve 84 only opens upon a pressure of 12,000 psi, and spring 93 is chosen so that valve 85 opens only upon a pressure of 16,000 psi. Thus, again, no sealing element has a pressure differential thereacross of more than 4,000 psi.

Other means for maintaining the pressure in the chambers 64 at the desired values could be employed; for instance instead of connecting piston 77 to the cavity 17, it could be connected to a controllable exterior pressure source.

It will thus be seen that according to the apparatus of the present inventon means have been provided for sealing a shaft or the like extending from a high-pressure region to a relatively low-pressure region whereby long-life of the sealing arrangement is achieved, and the torque exerted on the shaft by the sealing means is kept to a minimum. According to the method of the present invention, the sealing of a shaft extending from a high-pressure region to a low-pressure region is accomplished by arranging a plurality of sealing elements in sealing engagement with the shaft between the two regions so that the differential pressure on each of the sealing elements is not greater than a predetermined amount and so that no differential pressure action on any one sealing element is as large as the pressure differential between the two regions.

While the invention has been herein illustrated and described in what is presently conceived to be the most practical and preferred embodiment, it will be obvious to one of ordinary skill in the art that many modifications may be made thereof within the scope of the invention. For instance, any number of sealing elements could be employed, and the pressure differential across each need not be maintained at the same levels (although that is preferred). The shaft sealing arrangement could be utilized with shafts extending between high and low pressure regions for operating other means besides gate valves, and other elements similar to shafts could also be sealed thereby. A wide range of semi-solid or viscous flowable materials could be employed for supplying pressure according to the present invention, and a wide variety of types of and materials for sealing elements and differential back-pressure valves could be employed.. Many other modifications are also possible, thus it is intended that the invention be accorded the broadest interpretation of the appended claims so as to encompass all equivalent structures and methods.

What is claimed is

1. Apparatus comprising:
   a. a body having a cavity adapted to contain a fluid under high pressure,
   b. an operative element for functioning within said cavity, in response to the rotation of a shaft,
   c. a shaft extending through said body from said cavity to a region outside said body of relatively low pressure,
   d. means for providing a seal between said shaft and said body between said cavity and said region, said means including a plurality of sealing elements which are successively disposed between the relatively high and low pressure regions and sealing between said shaft and said body each having a side thereof toward said cavity and a side thereof opposite said cavity, and
   e. means for ensuring that the differential pressure on each of said sealing elements is not greater than a predetermined amount and that to sealing element differential pressure is as large as the pressure differential between said cavity and said low-pressure region.

2. Apparatus as recited in claim 1 wherein at least three sealing elements are provided and wherein the pressure differential across each sealing element is at most about one-third the pressure differential between said cavity and said low-pressure region.

3. Apparatus as recited in claim 1 wherein said means for ensuring that the differential pressure on each of said sealing elements is not greater than a predetermined amount, includes a chamber located in communicating relationship with one of said sealing elements on the side thereof opposite said cavity, and means for maintaining a flowable plastic material under a pressure in said chamber, said pressure having a magnitude between the pressures in said high-pressure cavity and said low-pressure region.

4. Apparatus as recited in claim 3 wherein said means for maintaining a flowable plastic material under pressure in said chamber includes a regulated pressure source remote from said body member but in communication therewith.

5. Apparatus as recited in claim 3 wherein said means for maintaining a flowable plastic material under pressure in said chamber includes an injection valve means for allowing the introduction of flowable plastic material under pressure into said chamber and for maintaining the flowable plastic material under pressure in said chamber once injected.

6. Apparatus as recited in claim 3 wherein said means for maintaining a flowable plastic material under a pressure in said chamber comprises a piston having one side thereof exposed to the pressure of fluid within said cavity and having the other side thereof on flowable plastic material in a channel in fluid communication with said chamber, and a differential back pressure valve interposed in a passageway between said channel and said chamber.

7. Apparatus as recited in claim 6 wherein said differential back pressure valve includes a valve member, a valve seat, and biasing means for supplying a pressure of a magnitude between the pressure in said cavity and the pressure in said region for biasing said valve member toward engagement with said valve seat.

8. Apparatus as recited in claim 1 further comprising a plurality of chamber, each in communication with the side of one sealing element nearest the region and the side of the adjacent sealing element nearest the cavity, and wherein said means for ensuring that the differential pressure on each of said sealing elements is not greater than a predetermined amount includes means for providing flowable plastic material under pressure in each of said chamber, the magnitude of the pressure in said chambers decreasing from said high pressure bore to said region.

9. Apparatus as recited in claim 8 wherein said means for providing flowable plastic material under pressure in each of said chambers comprises a piston having one side thereof exposed to the pressure of fluid within said cavity and having the other side thereof bearing on flowable plastic material in a channel in fluid communication with each of said chambers, and a plurality of differential back pressure valves, one interposed in a passageway between said channel and each of said chambers, and wherein each of said differential back pressure valves includes a valve member, a valve seat, and biasing means for supplying a pressure of a magnitude between the pressure in said cavity and the pressure in said region for biasing said valve member toward engagement with said valve seat, and the magnitude of the biasing pressure provided by the biasing means increasing from said high pressure cavity toward said region.

10. A gate valve assembly comprising
    a. a body having a bore extending therethrough, said bore adapted to carry fluid under high-pressure and defining a cavity,
    b. a bonnet operatively connected to said body,
    c. a valve member for opening and closing said bore,
    d. means for moving said valve member for opening and closing said bore, said means including a shaft extending from said body member through said bonnet to a region of relatively low pressure exterior of said bonnet,
    e. means in said region for rotating said shaft,
    f. means for providing a seal between said shaft and said bonnet intermediate said bore and said region, said means including a plurality of sealing elements which are successivly disposed between said cavity and said low-pressure region and seal between said shaft and said body each having a side thereof toward said cavity and a side thereof opposite said cavity, and
    g. means for ensuring that the differential pressure on each of said sealing elements is not greater than a predetermined amount and that no sealing element differential pressure is as large as the pressure differential between said cavity and said low-pressure region.

11. An assembly as recited in claim 10 wherein said means for moving said valve member includes a screw-threaded rod located within said bonnet and said body so that said shaft is not translated during operation of said valve member thereby, but is merely rotated.

12. Apparatus as recited in claim 10 wherein at least three sealing elements are provided and wherein the pressure differential across each sealing element is at most about one-third the pressure differential between said cavity and said low-pressure region.

13. An assembly as recited in claim 10 wherein said means for ensuring that the differential pressure on each of said sealing elements is not greater than a predetermined amount, includes a chamber greater than a predetermined amount, includes a chamber located in communicating relationship with one of said sealing elements on the side thereof opposite said bore, and means for maintaining a flowable plastic material under a pressure in said chamber, said pressure having a magnitude between the pressures in said high-pressure bore and said low-pressure region.

14. An assembly as recited in claim 13 wherein said means for maintaining a flowable plastic material under pressure in said chamber includes a regulated pressure source remote from said body member but in communication therewith.

15. An assembly as recited in claim 13 wherein said means for maintaining a flowable plastic material under pressure in said chamber includes an injection valve means for allowing the introduction of flowable plastic material under pressure into said chamber and for maintaining the flowable plastic material under pressure in said chamber once injected.

16. An assembly as recited in claim 13 wherein each of said sealing elements comprises a tubular member having a first seal located at one end thereof on the inside diameter thereof for sealing engagement with said shaft, and a second seal located at the other end thereof on the outside diameter thereof for sealing engagement with said bonnet, flowable plastic material in said chamber being adapted to apply pressure to both said first and second seals.

17. An assembly as recited in claim 16 further comprising an injection valve member for allowing the injection of flowable plastic material under pressure into said chamber.

18. An assembly as recited in claim 13 wherein said means for maintaining a flowable plastic material under a pressure in said chamber comprises a piston having one side thereof exposed to the pressure of fluid within said bore and having the other side thereof bearing flowable plastic material in a channel in fluid communication with said chamber, and a differential back pressure valve interpossed in a passageway between said channel and said chamber.

19. An assembly as recited in claim 18 wherein said differential back pressure valve includes a valve member, a valve seat, and biasing means for supplying a pressure of a magnitude between the pressure in said bore and the pressure in said region for biasing said valve member toward engagement with said valve seat.

20. An assembly as recited in claim 13 further comprising a plurality of chambers, one in operative relationship with the side of one sealing element nearest the region and the side of the adjacent sealing element nearest the bore, and wherein said means for ensuring that the differential pressure on each of said sealing elements is not greater than a predetermined amount includes means for providing flowable plastic material under pressure in each of said chamber, the magnitude of the pressures in said chambers decreasing from said high pressure bore to said region.

21. An assembly as recited in claim 20 wherein said means for providing flowable plastic material under pressure in each of said chambers comprises a piston having one side thereof exposed to the pressure of fluid within said bore and having the other side thereof bearing on flowable plastic material in a channel in fluid communication with each of said chambers, and a plurality of differential back pressure valves, one interposed in a passageway between said channel and each of said chambers, and wherein each of said differential back pressure valves includes a valve member, a valve seat, and biasing means for supplying a pressure of a magnitude between the pressure in said bore and the pressure in said region for biasing said valve member toward engagement with said valve, seat, and the magnitude of the biasing pressure provided by the biasing means increasing from said high pressure bore toward said region.

* * * * *